United States Patent [19]  
Oyoshi

[11] Patent Number: 5,066,514  
[45] Date of Patent: Nov. 19, 1991

[54] METHOD OF FORMING OPTICAL WAVEGUIDES BY ION IMPLANTATION

[75] Inventor: Keiji Oyoshi, Osaka, Japan

[73] Assignee: Nippon Sheet Glass Co., Ltd., Osaka, Japan

[21] Appl. No.: 466,838

[22] Filed: Jan. 18, 1990

[30] Foreign Application Priority Data

Jan. 26, 1989 [JP] Japan .................................. 1-17071  
Dec. 5, 1989 [JP] Japan ................................. 1-315961

[51] Int. Cl.$^5$ ........................ B05D 3/06; C23C 14/04
[52] U.S. Cl. ............................... 427/38; 427/43.1; 427/164; 427/165; 427/162; 250/492.3; 250/492.2
[58] Field of Search ............... 427/38, 43.1, 35, 162, 427/164, 165; 250/492.3, 492.2, 492.1; 65/3.11; 350/96.12; 437/21, 26

[56] References Cited

U.S. PATENT DOCUMENTS

| | | | |
|---|---|---|---|
| 4,145,457 | 3/1979 | Kersten | 427/38 |
| 4,262,056 | 4/1981 | Hubler et al. | 428/446 |
| 4,521,443 | 6/1985 | Naik et al. | 427/38 |
| 4,774,103 | 9/1988 | Kamigaito et al. | 427/38 |
| 4,789,642 | 12/1988 | Lorenzo et al. | 437/24 |
| 4,840,816 | 6/1989 | Appleton et al. | 427/38 |
| 4,847,504 | 7/1989 | Aitken | 250/492.2 |

Primary Examiner—Shrive Beck  
Assistant Examiner—Roy V. King  
Attorney, Agent, or Firm—Sughrue, Mion, Zinn, Macpeak & Seas

[57] ABSTRACT

An optical wave guide is formed by implanting at least two ionic species capable of forming an oxide, a nitride or a halide into the surface of a substrate.

10 Claims, 2 Drawing Sheets

METHOD OF FORMING OPTICAL WAVEGUIDES BY ION IMPLANTATION

BACKGROUND OF THE INVENTION

The present invention relates to a method of forming an optical waveguide, particularly to a method of forming a waveguide by ion implantation.

Several methods have been proposed for forming an optical waveguide in a glass substrate by ion implantation. According to the method reported by I. K. Naik (Appl. Phys. Lett., vol, 43, No. 6, pp. 519-520), nitron ions are implanted into the surface of a substrate made of fused quartz, optical glass, $SiO_2$-coated silicon, etc. and the substrate is then subjected to a heat treatment at 460° C. for 30 min. Naik reported that an optical waveguide suffering a loss of as low as 0.1 dB/cm could be obtained by this method.

However, the above-described method of forming an optical waveguide by ion implantation has had the serious problem that when the substrate implanted with nitrogen ions was heat-treated at temperatures higher than 500° C., the concentration of nitrogen in the substrate decreased so drastically that the formed optical waveguide disappeared.

SUMMARY OF THE INVENTION

It is therefore an object of the present invention to overcome the above described disadvantage of the prior art.

In accordance with the present invention, at least two ionic species capable of forming an oxide, a nitride or a halide are implanted into the surface of a substrate, which may be subjected to a heat treatment as required. The substrate in which an optical waveguide is to be formed may be made of glass, a ceramic material, a semiconductor or a metal.

The ionic species to be implanted must satisfy the following requirements: after implantation, they should undergo reaction in the substrate to form an oxide, nitride or halide compound; the compound thus formed should have a small absorption in the wavelength region of the light to be used; and the necessary difference in refractive index from the substrate can be attained with a preset dose of ion implantation.

The proportions of elements to be implanted into the substrate are desirably close to a stoichiometric ratio for the purpose of suppressing light absorption in the formed waveguide.

The accelerating voltages of ionic species to be implanted are desirably selected at such values that the implanted species will have the same projected range. The heat treatment of the substrate after ion implantation is not essential to the present invention but is desirably performed since it is effective for the purpose of suppressing optical transmission loss while improving the endurance (moisture and chemical resistance) of the region where ions were implanted.

The heat treatment is effective if it is performed at temperatures not lower than 200° C. The heating temperature is desirably as high as possible on the condition that it is lower than the melting or glass transition point of the substrate or that it does not exceed the glass transition point of the area where ions were implanted. Heating the substrate during ion implantation is as effective as the post heat treatment.

There is no particular limitation on the method of patterning an optical waveguide. In one method, the substrate is first covered with a mask such as a thin metal film or plate having openings made in accordance with a desired pattern of optical waveguide and ions are subsequently implanted into the surface of the substrate through the openings. In another method, a mask is not used and instead ions are implanted with respective ion beams that are allowed to converge in a predetermined waveguide pattern on the surface of the substrate. If desired, ion implantation may be performed at two stages, the first of which consists of ion implantation via a mask or with a converging ion beam and is followed by the second stage of ion implantation which is performed over the entire surface of the substrate.

The area of the substrate implanted with ions is typically used as an optical waveguide. However, the present invention encompasses another embodiment in which ions are implanted into all surface of the substrate to form a layer of low refractive index except in the area where an optical waveguide is to be formed, and the area not implanted with the ions is used as an optical waveguide.

According to the present invention, two or more elements in ionic form that have been implanted into the substrate combine with each other to form a compound which will remain thermally stable in a subsequent heat treatment. If nitrogen ions alone are injected into a glass substrate mainly made of silicon oxide, the concentration of nitrogen in the substrate will drop markedly upon subsequent heating at temperatures higher than 500° C. However, if an additional element such as silicon is implanted in ionic form, sites are supplied at which nitrogen can remain thermally stable and this is effective in preventing the concentration of nitrogen from decreasing upon subsequent heat treatment.

DETAILED DESCRIPTION OF THE INVENTION

Example 1

A quartz glass substrate indicated by 1 in FIG. 1 was provided. A Cr film 2 which would serve as a mask for ion implantation was formed on the surface of this substrate as shown in FIG. 1(a).

Figure 1A:
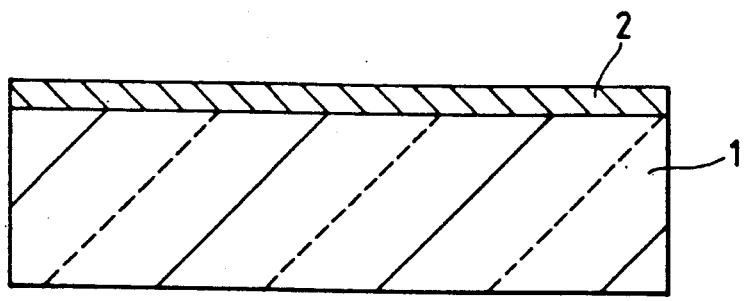
FIGS. 1(a), 1(b), 1(c) and 1(d) are cross sections showing the sequence of major steps involved in the fabrication of an optical waveguide according to a first embodiment of the present invention.
Figure 1B:
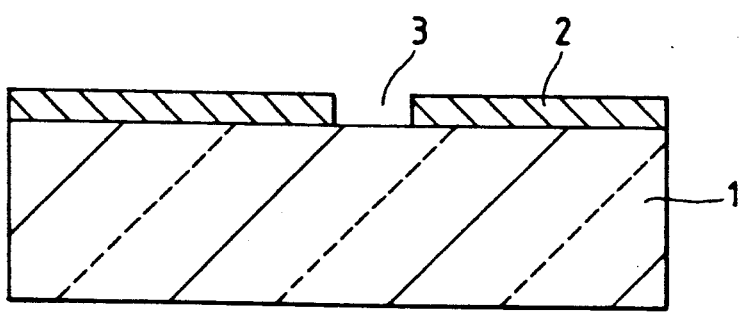

Then, openings 3 for an optical waveguide pattern were formed on the Cr film 2 by a well-known photolithographic technique [see FIG. 1(b)].

Figure 1C:
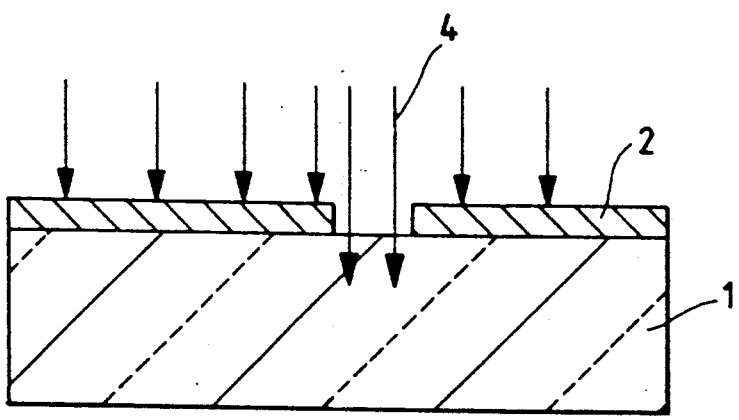
Figure 1D:
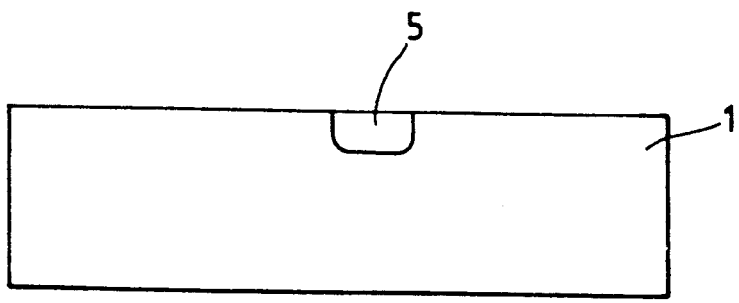

Subsequently, silicon and nitrogen ions 4 were successively implanted into the surface of the masked substrate at respective accelerating voltages of 100 keV and 50 keV (see FIG. 1(c)). The respective doses of silicon and nitrogen ions were $1 \times 10^{17}$ ions/cm$^2$ and $1.33 \times 10^{17}$ ions/cm$^2$.

The Cr mask 2 was thereafter etched away and the substrate was heat-treated at 900° C. for one hour. As a result, an optical waveguide 5 made of silicon nitride was formed in the substrate 1 [see FIG. 1(d)].

Analysis of the thus formed waveguide by secondary ion mass spectroscopy (SIMS) showed that the concentration of nitrogen did not decrease upon heat treatment. This result verified the effectiveness of the method of the present invention.

Example 2

Figure 2A:
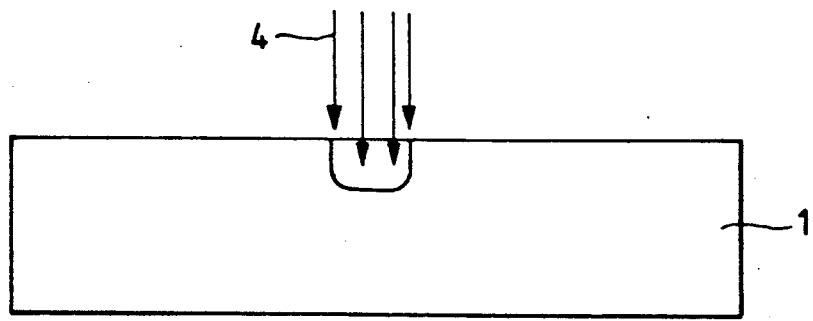
FIGS. 2(a), 2(b) and 2(c) are cross sections showing the sequence of major steps involved in the fabrication of an optical waveguide according to a second embodiment of the present invention.
Figure 2B:
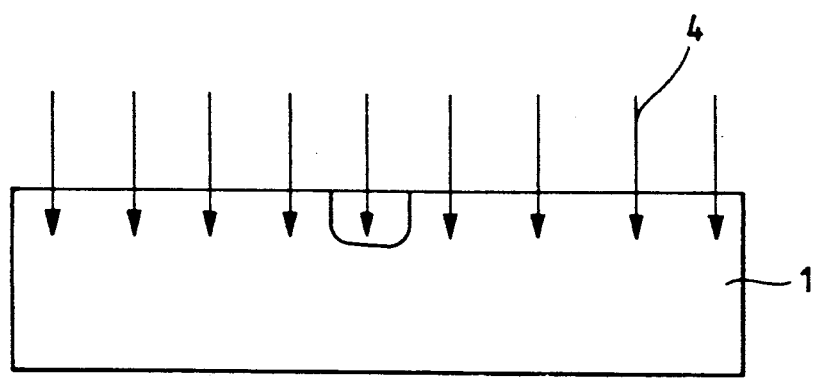
Figure 2C:
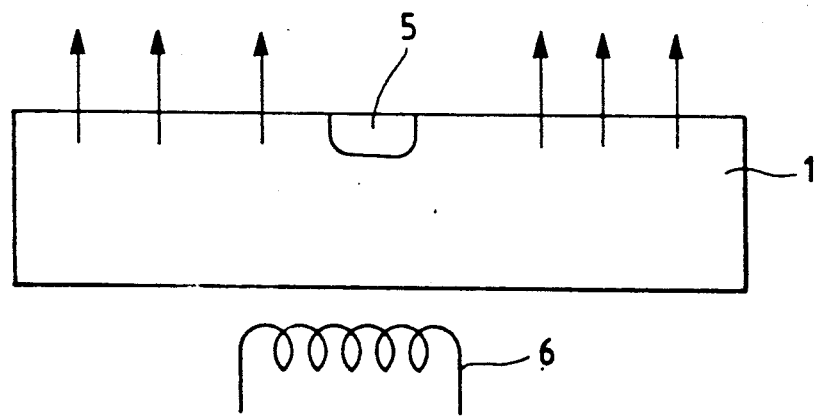

Using a focused ion beam implanting apparatus, silicon ion 4 was implanted into a waveguide patterned region on the surface of a quartz glass substrate 1 at an accelerating voltage of 100 keV and in a dose of $1 \times 10^{17}$ ions/cm$^2$ [see FIG. 2(a)]. As shown in FIG. 2(a), the waveguide patterned region showing silicon ions 4 occupies only a portion of the entire substrate surface 1. Thereafter, nitrogen ion 4 was implanted into the entire surface of the substrate at an accelerating voltage of 50 keV and in a dose of $1.33 \times 10^{17}$ ions/cm$^2$ using an unfocused ion beam implanting apparatus [see FIG. 2(b)]. The substrate was thereafter heated with a heater 6 at 900° C. for one hour as shown in FIG. 2(c) to remove the nitrogen that had been implanted into the non-waveguide area where silicon was not implanted.

As a result, a predetermined pattern of optical waveguide 5 made of a silicon nitride layer was obtained in the substrate 1. Analysis of the thus formed waveguide by SIMS showed that the concentration of nitrogen did not decrease upon heat treatment. This result verified the effectiveness of the method of the present invention.

Example 3

A quartz glass or sapphire substrate 1 was provided and a Cr film 2 which would serve as a mask for ion implantation was formed on the surface of this substrate as shown in FIG. 1(a). Then, openings 3 for an optical waveguide pattern were formed on the Cr film 2 by a well-known photolithographic technique [see FIG. 1(b)]. Subsequently, titanium and oxygen ions 4 were successively implanted into the surface of the masked substrate at respective accelerating voltages of 200 keV and 65 keV [see FIG. 1(c)]. The respective doses of titanium and oxygen ions were $1 \times 10^{17}$ ions/cm$^2$ and $2 \times 10^{17}$ ions/cm$^2$. Thereafter, the Cr mask 2 was etched away and the substrate was heat-treated at 1,000° C. for one hour. As a result, an optical waveguide 5 composed of a region containing titanium oxide was formed in the substrate 1 [see FIG. 1(d)].

Light from a He-Ne laser was made incident upon the optical waveguide of 10 cm length that was fabricated by the method described above. It was confirmed that the light could successfully be transmitted therethrough. As a comparison, a waveguide was formed by performing a similar heat treatment after implanting only oxygen ions. The two samples were subjected to analysis by SIMS. The comparative sample had its oxygen concentration reduced to the initial level (before implantation) subsequent to the heat treatment. On the other hand, this phenomenon did not occur in the sample prepared by implanting both titanium and oxygen ions. Thus, the effectiveness of the method of the present invention was verified.

Example 4

Using a focused ion beam implanting apparatus, aluminum ions 4 were injected into a waveguide patterned region on the surface of a quartz glass substrate 1 at an accelerating voltage of 150 keV and in a dose of $1 \times 10^{17}$ ions/cm$^2$ [see FIG. 2(a)]. As shown in FIG. 2(a), the waveguide patterned region showing aluminum ions 4 occupies only a portion of the entire substrate surface 1. Thereafter, nitrogen ions 4 were injected into the entire surface of the substrate at an accelerating voltage of 100 keV and in a dose of $1 \times 10^{17}$ ions/cm$^2$ without focusing the ion beam [see FIG. 2(b)]. The substrate was thereafter heat-treated at 1,000° C. for one hour as shown in FIG. 2(c) to remove the nitrogen that had been implanted into the non-waveguide region where aluminum was not implanted. As a result, an optical waveguide 5 composed of a region containing aluminum nitride was formed in the substrate 1.

Light from a He-Ne laser was made incident upon the optical waveguide of 10 cm length that was fabricated by the method described above, and was confirmed that the light could successfully be transmitted therethrough. Analysis of this waveguide by SIMS showed that the concentration of nitrogen did not decrease upon heat treatment, thus verifying the effectiveness of the method of the present invention.

Example 5

A quartz glass substrate 1 was provided and a Cr film 2 which would serve as a mask for ion implantation was formed on the surface of this substrate as shown in FIG. 1(a). Then, openings 3 for an optical waveguide pattern were formed on the Cr film 2 by a well-known photolithographic technique [see FIG. 1(b)]. Subsequently, lithium and chlorine ions 4 were successively implanted into the surface of the masked substrate at respective accelerating voltages of 26 keV and 150 keV [see FIG. 1(c)]. The respective doses of lithium and chlorine ions were $1 \times 10^{17}$ ions/cm$^2$. Thereafter, the Cr mask 2 was etched away and the substrate was heat-treated at 1,000° C. for one hour. As a result, an optical waveguide 5 composed of a region containing lithium chloride was formed in the substrate 1 [see FIG. 1(d)].

Light from a He-Ne laser was made incident upon the optical waveguide of 10 cm length that was fabricated by the method described above, and was confirmed that the light could successfully be transmitted theretrough. As a comparison, a waveguide was formed by performing a similar heat treatment after implanting only chlorine ions. The two samples were subjected to analysis by SIMS. The comparative sample had chlorine eliminated upon heat treatment. On the other hand, the chlorine content did not decrease in the sample prepared by implanting both lithium and chlorine ions, and this verified the effectiveness of the method of the present invention.

According to the present invention, a highly heat-stable optical waveguide can be formed on a substrate having high heat resistance, and this enables the fabrication of optoelectronic substrates with an optical waveguide that withstand the manufacturing process of light-emitting and receiving devices. If a compound that has small absorption of light in the operating wavelength region and that differs greatly from the substrate in terms of refractive index is selected (e.g. silicon nitride has a refractive index of about 2.1 whereas titanium oxide has an index of about 2.5), an optical waveguide can be formed with ions being implanted in smaller amounts to attain the necessary difference in refractive index. This contributes to a lower cost for the formation of waveguides.

Further, the present invention expands the scope of substrate materials which can be used in the fabrication of optical waveguides.

What is claimed is:

1. A method of forming an optical waveguide, comprising a step of implanting at least two ionic species into the surface of a substrate, said ionic species being capable of forming an oxide, a nitride or a halide, wherein at least one of said two ionic species is implanted in a portion of said substrate surface which is less than the entire substrate surface, such that said ionic species combine with each other forming said oxide, nitride or halide which is thermally stable in a subsequent heat treatment of said optical waveguide.

2. A method according to claim 1, wherein said ionic species are silicon and nitrogen ions.

3. A method according to claim 1, wherein said ionic species are titanium and oxygen ions.

4. A method according to claim 1, wherein said ionic species are aluminum and nitrogen ions.

5. A method according to claim 1, wherein said ionic species are lithium and chlorine ions.

6. A method according to claim 1 further comprising steps of covering said substrate with a mask material and forming openings for a waveguide pattern in said mask material, said ionic species being implanted into said substrate through said openings.

7. A method according to claim 1 further comprising steps of covering said substrate with a mask material, forming openings for a waveguide pattern in said mask material, and removing said mask material, one of said ionic species being implanted into said substrate through said openings and the other being implanted into the entire surface of said substrate after said mask material is removed.

8. A method according to claim 1, wherein said ionic species are implanted by using a converging ion beam.

9. A method according to claim 1, wherein one of said ionic species is implanted by using a converging ion beam and then the other is implanted into the entire surface of said substrate.

10. A method according to claim 1, wherein said ionic species are successively implanted into the surface of said substrate.

* * * * *